United States Patent
Ravinuthula et al.

(10) Patent No.: US 7,596,589 B2
(45) Date of Patent: Sep. 29, 2009

(54) TIME-MODE ANALOG COMPUTATION CIRCUITS AND METHODS

(75) Inventors: Vishnu V. Ravinuthula, Gainesville, FL (US); John G. Harris, Gainesville, FL (US); Jose A. B. Fortes, Gainesville, FL (US)

(73) Assignee: University of Florida Research Foundation, Inc., Gainesville, FL (US)

( * ) Notice: Subject to any disclaimer, the term of this patent is extended or adjusted under 35 U.S.C. 154(b) by 835 days.

(21) Appl. No.: 11/104,141

(22) Filed: Apr. 12, 2005

(65) Prior Publication Data
US 2005/0231398 A1 Oct. 20, 2005

Related U.S. Application Data

(60) Provisional application No. 60/561,354, filed on Apr. 12, 2004.

(51) Int. Cl.
*G06G 7/02* (2006.01)

(52) U.S. Cl. .................................... 708/819

(58) Field of Classification Search ................ 708/819
See application file for complete search history.

(56) References Cited

U.S. PATENT DOCUMENTS

| | | | | |
|---|---|---|---|---|
| 2,976,487 A | * | 3/1961 | Cohen | 327/261 |
| 3,032,714 A | * | 5/1962 | Cohen | 327/283 |
| 5,345,401 A | * | 9/1994 | Tani | 703/16 |
| 5,502,419 A | | 3/1996 | Kawasaki et al. | |
| 5,515,291 A | * | 5/1996 | Omori et al. | 716/6 |
| 5,771,337 A | | 6/1998 | Venier | |

* cited by examiner

*Primary Examiner*—Tan V Mai
(74) *Attorney, Agent, or Firm*—Thomas, Kayden, Horstemeyer & Risley, LLP

(57) ABSTRACT

A time-mode analog computation circuit is provided. The time-mode analog computation circuit includes one or more inputs for receiving one or more temporal input signals. The time-mode analog computation circuit further includes circuitry for performing a mathematical operation based on the one or more temporal input signals. A result of the mathematical operation is expressed in a timing of an output signal generated by the circuit.

20 Claims, 11 Drawing Sheets

TIME-MODE ANALOG COMPUTATION CIRCUITS AND METHODS

CROSS-REFERENCE TO RELATED APPLICATION

This application claims the benefit of U.S. Provisional Application No. 60/561,354, filed Apr. 12, 2004, which is incorporated herein by reference.

STATEMENT REGARDING FEDERALLY SPONSORED RESEARCH OR DEVELOPMENT

The United States government may have certain rights to the invention by virtue of support through National Science Foundation grant no. EIA 0135946 and National Aeronautics and Space Administration grant no. NCC 2-1363.

FIELD OF THE INVENTION

This invention relates to analog computational circuits, more specifically to computation circuits, which utilize time as both input and output quantities (operating in time-mode).

BACKGROUND OF THE INVENTION

Conventional VLSI circuits typically perform computational procedures using voltages and currents for both input and output signals. With technology scaling, the degrees of freedom for using voltages and currents for computations are generally more restricted. This can result in computational circuits that exhibit a poor signal-to-noise ratio (SNR), very limited Dynamic Range (DR), and/or high power consumption.

These factors are likely to be significant impediments to the development of more efficient and more effective analog computation circuits in the future, especially in light of the problems posed by technology scaling. Complementary metal-oxide semiconductor (CMOS) process technology, in particular, has lead to scaling that requires significant reductions in the chip "real estate" consumed by analog circuitry. Moreover, as CMOS process technology continues to shrink the usable voltage swing in such circuits, traditional analog circuit designs have been rendered less practicable. Thus there is a need for an alternative to conventional voltage-based and current based computations.

SUMMARY OF THE INVENTION

The present invention provides the circuit building blocks and techniques for computations using analog temporal signal function representations for both inputs and outputs. The invention enables computations using the timing of asynchronous events, for example. The computations performed with the circuits and methods of the invention produce results that can be expressed as time. For example, the result of a computation with the invention can be a time-based parameter corresponding to the timing of a signal output. This obviates the need for translation of temporal signals to an analog or digital form. The invention further overcomes limitations to scaling inherent in voltage-based and current-based computation circuits.

One embodiment of the invention is a time-mode analog computation circuit. The time-mode analog computation circuit can include one or more inputs for receiving one or more temporal input signals. The time-mode analog computation circuit further can include circuitry for performing a mathematical operation based on the one or more temporal input signals. A result of the mathematical operation can be expressed in the timing of an output signal generated by the circuit.

Another embodiment of the present invention is a signal processing method. The method can include providing one or more temporal input signals and performing a mathematical operation based on the one or more temporal input signals. The method, moreover, further includes expressing a result of the mathematical operation in a timing of an output signal.

BRIEF DESCRIPTION OF THE DRAWINGS

A fuller understanding of the present invention and the features and benefits thereof will be accomplished upon review of the following detailed description together with the accompanying drawings, in which.

DETAILED DESCRIPTION OF THE INVENTION

Figure 1:
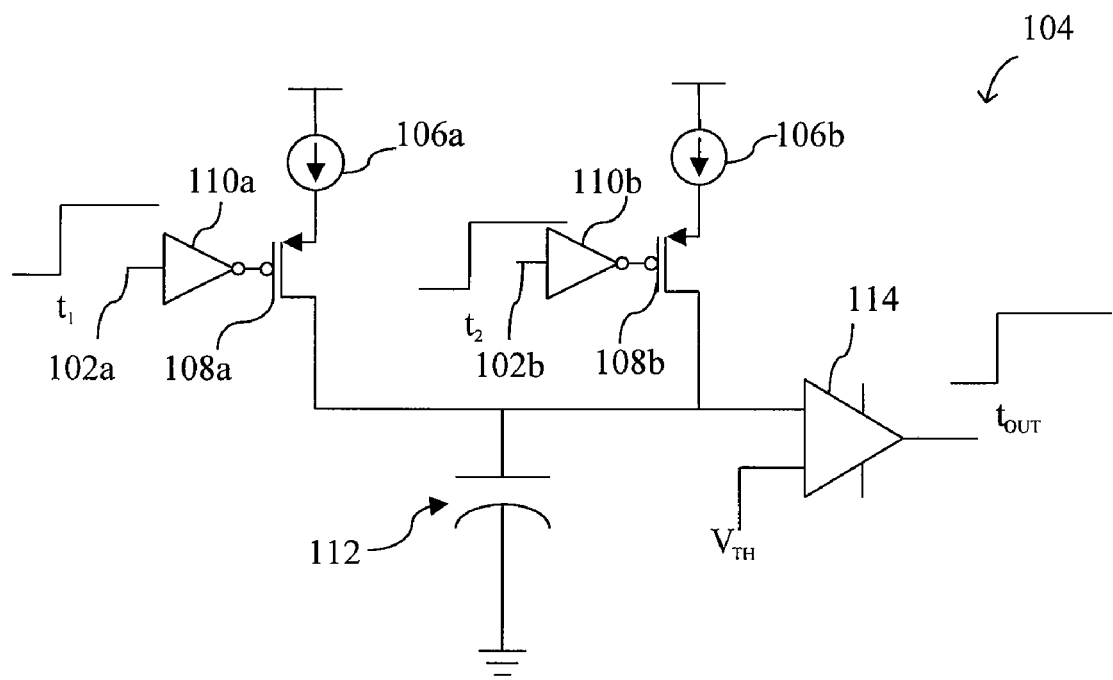
FIG. 1 is a schematic diagram of a time-mode computation circuit that computes the average or weighted average of two temporal signals, according to one embodiment of the invention.

A time-mode analog computation circuit according to the invention includes at least one input for receiving a temporal input signal and circuitry for performing a mathematical operation on the temporal input signal, a result of the mathematical operation being expressed in a timing of an output signal generated by the computation circuit. The invention thus provides analog computation using the timing of asynchronous events. Although described herein mainly with respect to MOS designs, one of ordinary skill in the art having the benefit of the description will appreciate that the invention can be practiced using bipolar, Bi-MOS, and other transistor-based devices and processes.

With conventional devices and processes that use time-based signal representations, such as pulse-width modulation (PWM) and sigma-delta converters, temporal codes are used only as temporary representations; computation is only performed after their translation to a traditional analog or digital form. Computation according to the invention, by contrast, represents a computed output quantity as a time, or more precisely, a time-based parameter. Translation from a temporal representation to an analog or digital form is not required, therefore, with the invention because computation is not based upon voltage or current levels but rather on the timing of changes in voltage or current levels. The invention thus overcomes the limitations imposed with conventional voltage-based and current-based computation circuits as the scaling process proceeds. Significantly, therefore, time-based computation circuits according to the invention are not substantially impacted by the scaling of technology.

The input to the time-mode computation circuits can be supplied from a variety of sources. For instance, the inputs could be from time-based sensors whose outputs encode measured real-world quantities in the timing of the signals. Another possibility is that the inputs to the time-mode computation circuit are the outputs from other time-mode circuits, since several layers of time-mode blocks can be cascaded. The outputs from the computation circuits according to the invention, moreover, can be stored in a digital memory after an appropriate analog-to-digital conversion of the time-mode signal.

As demonstrated herein, time-mode computation according to the invention can in many instances provide both a high signal-to-noise ratio (SNR) and an expansive dynamic range (DR). Moreover, power consumption in many instances can be reduced as compared to conventional voltage-based and current-based computation circuits. Therefore, VLSI circuits, which require some type of computation circuitry can be improved by representing signals in time, performing time-based computation, and representing computed output quantities as a time and/or a plurality of times (i.e., time-based parameters) according to the invention.

Exemplary circuitry for performing time-mode computations are described operationally herein for step inputs, where tpu input corresponds to a time-varying voltage signal, v(t), or time-varying current signal, i(t), represented by the following step waveforms or functions, respectively:

$$v(t) = \begin{cases} v_o, & t \geq t_0 \\ 0, & t < t_0 \end{cases}, \text{ and } i(t) = \begin{cases} i_o, & t \geq t_0 \\ 0, & t < t_0 \end{cases}.$$

Using such an analog temporal step function representation for the inputs, computation outputs, represented as time-based parameters, are described for the following computations:

1) Weighed Averaging;
2) Addition;
3) Weighed Subtraction;
4) Scalar Multiplication;
5) Maximum Value Determination;
6) Minimum Value Determination; and
7) Thresholded Difference Determination.

These time-based computation circuits can be classified based on their output style:

| OUTPUT | Single-ended | Differential |
|---|---|---|
| Absolute time reference | Weighted Averaging Circuit<br>Weighted Subtraction Circuit<br>MAX circuit<br>MIN circuit | Thresholded Difference Block |
| Relative time reference | Addition Circuit<br>Scalar Multiplication Circuit | |

FIG. 1 illustrates a time-mode analog computation circuit 100, according to one embodiment of the invention. The computation circuit 100 illustratively includes two inputs, a first input 102a and a second input 102b, for receiving two distinct temporal input signals and circuitry 104 for performing a mathematical operation based on the temporal input signals. The mathematical operation performed by the circuitry 104, more particularly, is the computation of an average or weighted average of the two temporal signals. The result of the mathematical operation, as explained below, is expressed in a timing of an output signal generated by the circuitry.

The two distinct temporal input signals are illustratively step inputs, the waveforms or functions of which are shown adjacent the two inputs 102a, 102b where the step inputs are respectively received. The use of signals that can be represented as step functions not only simplifies somewhat the discussion of the operation of the computation circuit 100, but has the added advantage that such signal representation closely approximates "fast-rise" time signals that typically hold particular interest for modern circuit designers.

The circuitry 104, more particularly, illustratively includes a first current source 106a and a second current source 106b. A first transistor 108a is electrically connected to the first current source 106a, and a second transistor 108b is connected to the second current source 106b. Illustratively, each of the transistors 108a, 108b is a p-channel metal oxide semiconductor (PMOS) transistor comprising a source, drain, and gate. A first signal inverter 110a is illustratively connected between the first input 102a and the gate of the first transistor 108a, and a second signal inverter 110b is illustratively connected between the second input 102b and the gate of the second transistor 108b.

As further shown, the drain of each of the transistors 108a, 108b connects to a capacitor 112, having capacitance C. The drain of each of the transistors 108a, 108b also connects to a first input of a comparator 114, the second input of the comparator receiving a threshold voltage, $V_{TH}$.

Operatively, the computation circuit 100 performs a weighted average of temporal signals, illustratively provided by the two step inputs. The rising edge of a step input at the first input 102a occurs at time $t_1$. The rising edge of the step input at the second input 102b occurs at time $t_2$. Each of the transistors 108a, 108b acts as a switch. Accordingly, at $t_1$, the increase in voltage at the gate of the first transistor 108a opens a path for the first current source 106a connected to the first transistor. The first current source 106a provides a current $I_1$. The resulting current, $I_1$, reaches the capacitor 112 connected to the first transistor 108a, and the capacitor begins to charge. If $t_2 > t_1$, then the increase in voltage at the gate of the second transistor occurs subsequently. When it does, the increase in voltage at the gate of second transistor 108b opens a path for the second current source 106b that is also connected to the capacitor 112. With the path open, the second current source 106b provides a current, $I_2$, to the capacitor 112, and the rate that the capacitor charges increases correspondingly.

Initially, a voltage across the capacitor 112 can be reset to 0 v. The voltage remains at zero until $t_1$ when the step in voltage at the gate of the first transistor 108a occurs, turning on the first transistor. The charge across the capacitor 112 continues to increase until $t_2$ when the step in voltage at the gate of the second transistor 108b occurs, turning on the second transistor and causing the voltage across the capacitor to increase faster. The comparator 114 senses the voltage across the capacitor 112, and when the voltage reaches the threshold, $V_{TH}$, the comparator responds by generating a step output. The time at which the step output occurs is designated $t_{OUT}$.

During the period between $t_1$ and $t_2$, the voltage, $V_{temp}$, across the capacitor 112 is:

$$V_{temp} = \frac{I_1}{C}(t_2 - t_1),$$

where $I_1$ is the current provided by the first current source 106a and C is the capacitance of the capacitor 112.

Similarly, during the period $t_2$ to $t_{OUT}$, the voltage across the capacitor is:

$$V_{TH} - V_{temp} = \frac{I_1 + I_2}{C}(t_{OUT} - t_2),$$

wherein, $I_1$ is again the current provided by the first current source 106a, $I_2$ is the current provided by the first current source 106b, and C is again the capacitance of the capacitor 112.

The preceding equations can be used to solve for an equation describing the output of the circuit in terms of time; that is in terms of a time-based parameter as opposed to one based on either voltage or current:

$$t_{OUT} = \frac{I_1 t_1 + I_2 t_2}{I_1 + I_2} + \frac{CV_{TH}}{I_1 + I_2} \quad (1)$$

where, as described above, $t_{OUT}$ is the time at which the output step occurs; that is, when the output of the circuitry transitions from a low voltage to a high voltage.

Thus, the two current sources 106a, 106b connected to a respective source of each of the transistors 108a, 108b charge the capacitor 112 according to the particular timing of the respective step inputs, with the result being that the output of the computation circuit 100 is a time-based parameter. The time-based parameter, more particularly, corresponds to a time at which the comparator 114, sensing the voltage across the capacitor 112, generates a step output when the voltage across the capacitor reaches the threshold voltage $V_{TH}$ of the comparator.

From the above equation, it is observed that the computation circuit 100 computes the weighted average of two input time steps occurring at $t_2$ and $t_1$ when the condition $|I_2 t_2 - I_1 t_1| < CV_{TH}$ is met.

When $I_1 = I_2 = I$, the following is obtained:

$$t_{OUT} = \frac{t_1 + t_2}{2} + \frac{CV_{TH}}{2I}$$

This output corresponds to an unweighted (simple) averaging of the two input time steps occurring at $t_1$ and $t_2$ when the condition $$|t_1 - t_2| < \frac{CV_{TH}}{I}$$

is met, offset by the time interval represented by $CV_{TH}/2I$. By varying the amount of current provided by the current sources $I_1$ and $I_2$, so that $I_1$ and $I_2$ are not equal, circuit 100 could compute the weighted average of two input signals. For example, if $I_1 = 2I_2$, input $t_1$ would be given twice the weight given to $t_1$.

It should be noted at this point that although the operation of a computation circuit according to the invention is herein described primarily in terms of voltage step inputs, the invention can readily be adapted to process other types of signals and other signal forms corresponding to discrete timing events. For instance, the computation circuits can perform computations based upon current-based step inputs, provided that the circuit uses this input to open or close an appropriate switch provided by a PMOS or other type of transistor. For example, if current-based inputs are used in place of voltage-based inputs, when a transistor is off, no current flows through its drain to charge the capacitor. However, as soon as a non-zero current input is provided, the transistor turns on and starts to conduct current from the current source to charge the capacitor as already described.

Moreover, although only two step inputs are provided to the computation circuit 100 shown in FIG. 1, with an appropriate number of inputs added, an arbitrary number of input steps, such as 3, 4, 5, or more step inputs can be received. Note also that the signal inverters 110a, 110b shown in FIG. 1 would not be necessary if n-channel metal oxide semiconductor (NMOS) transistors were used to sink current instead of PMOS transistors.

Figure 2:
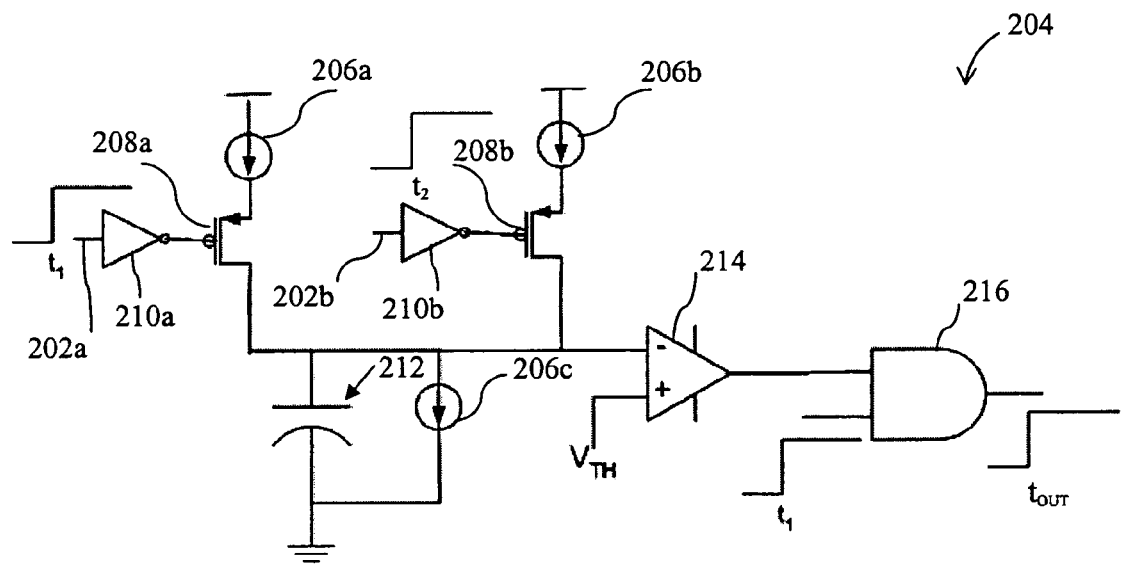
FIG. 2 is a schematic diagram of a time-mode computation circuit that computes the weighted or unweighted sum of two temporal signals, according to another embodiment of the invention.

Referring now to FIG. 2, a time-mode analog computation circuit 200, according to another embodiment of the invention is illustrated. The computation circuit 200 illustratively includes a first input 202a and a second input 202b for receiving, respectively, a first temporal input signal at $t_1$ and a second temporal input signal at time $t_2$. The computation circuit also includes circuitry 204 for performing a mathematical operation based on the temporal input signals, the mathematical operation defining the computation of a weighted or unweighted sum of the two temporal input signals and the result of the mathematical operation being expressed as a timing of an output signal generated by the circuit.

The circuitry 204, more particularly, illustratively includes a first current source 206a, a second current source 206b, and a third current source 206c. The circuitry 204 further includes a first transistor 208a and a second transistor 208b. Illustratively, the first and second transistors 208a, 208b are each PMOS transistors having a source, drain, and gate. The gate of the first transistor 208a is electrically connected to the first input 202a, with a first signal inverter 210a being connected between the gate and first input. The gate of the second transistor 208b is electrically connected to the second input 202b, with a second signal inverter 210b being connected between the gate and second input. The third current source 206c is connected between the drains of the first and second transistors 208a, 208b and ground.

Additionally, the circuitry 204 illustratively includes a capacitor 212 connected between ground and the respective drains of each of the first and second transistors 208a, 208b. The circuitry 204 also illustratively includes a comparator 214 having a first input connected to the respective drains of each of the first and second transistors 208a, 208b and a second input connected to a voltage source providing a threshold voltage, $V_{TH}$. A logic AND gate 216 having a first input connected to the output of the comparator 214 and a second input for receiving the first temporal input signal at $t_1$ and an output is also a component of the circuitry 204. Illustratively, both the first temporal input signal at $t_1$ and the second temporal input signal at time $t_2$ are each step inputs.

The output of the logic AND gate 216 provides a single-ended output. The inputs and outputs occurring at $t_1$, $t_2$ and $t_{OUT}$, respectively, are defined with respect to a time reference. When the reference time begins, the third current source 206c provides a current $I_3$ that starts discharging the capacitor 212. When the first temporal signal is applied to the computation circuit 200 at time $t_1$, the first current source 206a provides a current $I_1$. As a result, a total current defined by the difference $I_1-_3$ between the respective currents provided by the first and third current sources 206a, 206c, respectively, starts charging the capacitor 212. When the second input signal is applied to the computation circuit 200 at a time $t_2$, the second current source 202b provides current $I_2$ and the net current $I_1+I_2-I_3$ charges the capacitor 212. When the voltage across capacitor 212 reaches the threshold voltage, $V_{TH}$, of the comparator 214, the computation circuit 200 outputs a step output at time $t_{OUT}$.

Without the logic AND gate 216 in series with the output of the comparator 214 shown in FIG. 2, the output of the comparator would contain an unwanted pulse at the reference time because the positive and negative terminals of the comparator would carry the same voltage, $V_{TH}$. The logic AND gate 216 connected to the output of the comparator 214 ensures that the output from the block contains only a step output at time $t_{OUT}$, $t_{OUT}$ again being the time when the output of the computation circuit 200 illustratively makes its transition from a low to high voltage. The time value, $t_{OUT}$ is determined according to the following formula:

$$t_{OUT} = \left(\frac{I_1}{I_1 + I_2 - I_3}\right)t_1 + \left(\frac{I_2}{I_1 + I_2 - I_3}\right)t_2 \quad (2)$$

From equation (2), it is observed that the computation circuit 200 computes a weighted sum of the two step inputs occurring, respectively, at times $t_1$ and $t_2$. When $I_1=I_2=I_3=I$, the following result is obtained:

$$t_{OUT}=t_1+t_2$$

This situation corresponds to the sum of two step inputs occurring at $t_1$ and $t_2$, as already stated. However, by controlling the magnitudes of the current sources, functionalities different from the block-sum and weighted sum alternately can be obtained.

Figure 3:
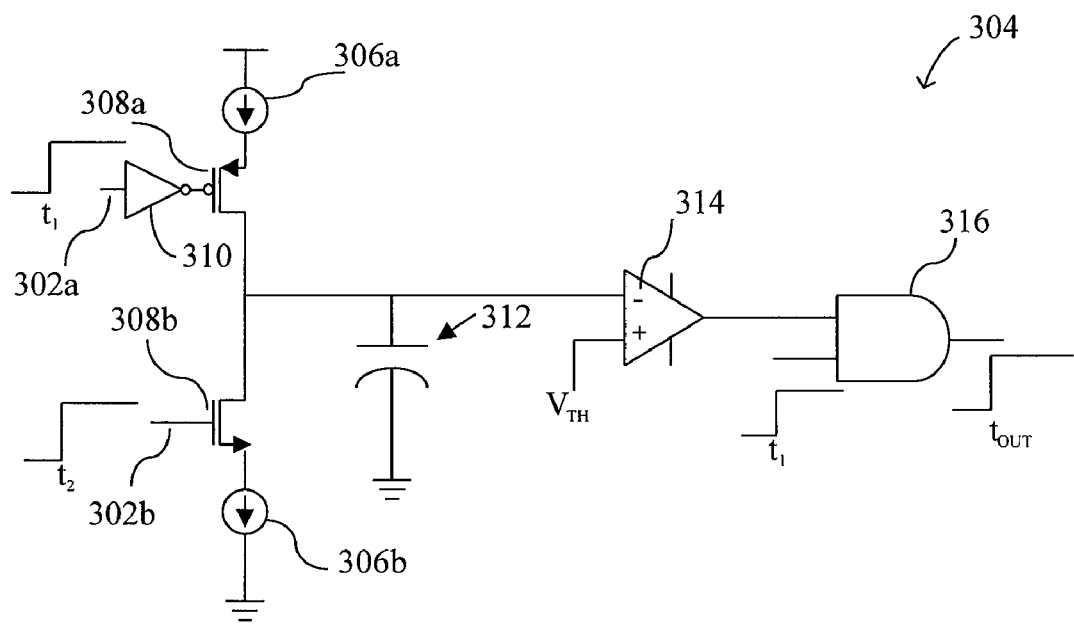
FIG. 3 is a schematic diagram of a time-mode computation circuit that computes the weighted difference of two temporal signals, according to yet another embodiment of the invention.

A computation circuit 300 for computing a weighted difference of two temporal signals, according to yet another embodiment of the invention, is illustrated in FIG. 3. The computation circuit 300 illustratively includes a first input 302a for receiving the first of the two temporal input signals at time $t_1$ and a second input 302b for receiving the second of the two temporal input signals at time $t_2$. The computation circuit 300 further includes circuitry 304 for computing the weighted difference, the result of the computation being expressed in a timing of an output signal generated by the circuit.

The circuitry 304 illustratively includes first and second current sources 306a, 306b as well as first and second transistors 308a, 308b. Illustratively, the first transistor 308a is a PMOS transistor having a source, drain, and gate, wherein the source is connected to the first current source 306a and the gate is connected to a signal inverter 310 that, in turn, is connected to the first input 302a. The second transistor 308b is illustratively an NMOS transistor having a source, drain, and gate, wherein the drain of the second transistor is connected to the drain of the first transistor 308a. The gate of the second transistor 308b is connected to the second input 302b, and the source of the second transistor 308b is connected to the second current source 306b.

The circuitry 304 further illustratively includes a capacitor 312 connected between ground and the juncture of the drain of the first transistor 308a and the drain of the second transistor 308b. Also illustratively included in the circuitry 304 is a comparator 314 having first and second inputs and an output. The first input of the comparator 314 is connected to the juncture of the drain of the first transistor 308a and the drain of the second transistor 308b. The second input of the comparator 314 is connected to a voltage source providing a threshold voltage, $V_{TH}$. The circuitry 304 also illustratively includes a logic AND gate 316. The logic AND gate 316 has a first input connected to the output of the comparator 314 and a second input that receives the first temporal input signal at time $t_1$. Illustratively, both the first temporal input signal at $t_1$ and the second temporal input signal at time $t_2$ are each step inputs. The output of the computation circuit 300 is the output of the logic AND gate 316. The output is a single-ended output having absolute time as its reference.

Note that in replacing a PMOS transistor with an NMOS transistor and changing the direction of the current provided by the second current source, the previously described computation circuit 100 is transformed into the computation circuit 300 shown in FIG. 3 for performing a weighted subtraction of input signals occurring at $t_1$ and $t_2$.

It is assumed with respect to the computation circuit 300 that the capacitor 316 is initially charged to a voltage $V_{TH}$. As soon as the first temporal signal, illustratively a step input, is applied to circuit 300 at time $t_1$, the first current source 306a provides a current $I_1$ that begins charging the capacitor 312. When the step input occurs at time $t_2$, the second current source 306b provides a current $I_2(I_2>I_1)$ that begins discharging the capacitor 312. When the capacitor 312 voltage reaches the threshold voltage, $V_{TH}$, the comparator 314 outputs a step output at time $t_{OUT}$. As with circuit 200, the output of the comparator 314 in circuit 300 would contain an unwanted pulse at the reference time because the positive and negative terminals of the comparator would carry the same voltage $V_{TH}$. The AND gate 316 connected to the output of the comparator 314 ensures that the output from the block contains only a step output at time $t_{OUT}$.

The output of the computation circuit 300 at time $t_{OUT}$ is given by the following equation:

$$t_{OUT} = \frac{I_2 t_2 - I_1 t_1}{I_2 - I_1} \quad (3)$$

From the equation it is seen equation that the computation circuit 300 applies a weight $$\left(\frac{I_2}{I_2 - I_1}\right)$$

to $t_2$ and a weight $$\left(\frac{I_1}{I_2 - I_1}\right)$$

to $t_1$.

Figure 4:
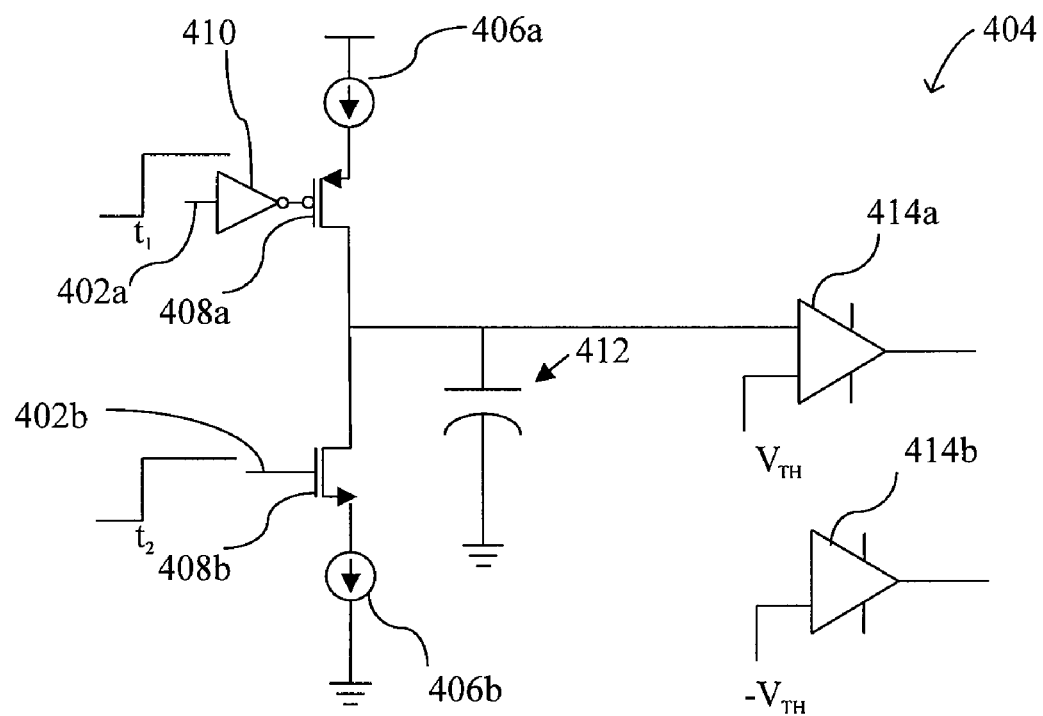
FIG. 4 is a schematic diagram of a time-mode computation circuit that computes the thresholded difference between two temporal signals, according to still another embodiment of the invention.

FIG. 4 illustrates a computation circuit 400 that computes a threshold difference between two temporal signals, according to still another embodiment of the invention. The computation circuit 400 illustratively includes a first input 402a for receiving the first of the two temporal input signals at time $t_1$ and a second input 402b for receiving the second of the two temporal input signals at time $t_2$. Illustratively, the computation circuit 400 additionally includes circuitry 404 for computing the threshold difference, the result being expressed in a timing of an output signal generated by the circuit.

The circuitry 404 illustratively includes a first current source 406a and a second current source 406b. The circuitry also illustratively includes a first transistor 408a and a second transistor 408b. The first transistor 408a is illustratively a PMOS transistor having a source, drain, and gate. The source of the first transistor 408a is connected to the first current source 406a, and the gate of the first transistor is connected to a signal inverter 410, which, in turn, is connected to the first input 402a. The second transistor 408b is illustratively an NMOS transistor having a source, drain, and gate. The drain of the second transistor 408b is connected to the drain of the first transistor 408a, and the gate of the second transistor is connected to the second input 402b. The source of the second transistor 408b is connected to the second current source 406b.

Illustratively, the circuitry 404 further includes a capacitor 412 connected between ground and the juncture of the drain of the first transistor 408a and the drain of the second transistor 408b. The circuitry further includes a first comparator 414a and a second comparator 414b. The first comparator 414a has a first input connected to the juncture of the drain of the first transistor 408a and the drain of the second transistor 408b, and a second input of the of the first comparator 414a is connected to a voltage source providing a threshold voltage, $V_{TH}$. The second comparator 414b has a first input connected also to the juncture of the drain of the first transistor 408a and the drain of the second transistor 408b. A second input of the second comparator 414b, however, is connected to a voltage source providing a negative threshold voltage, $-V_{TH}$.

The computational circuit 400 can be used to check whether the time difference between two temporal signals is greater than or equal to a threshold value ($CV_{TH}/I$). One application for such as circuit is for time-based edge detection. For example, the thresholded difference circuit 400 can be used to process the outputs of a time-based imager and determine the presence or absence of edges in images. A similar time-based edge detection circuit can also be used to determine significant differences between adjacent sensors in arrays of any type of time-based sensor, each such sensor generating signals in response to predetermined phenomena or conditions as will be readily understood by-one of ordinary skill in the art.

By replacing a PMOS transistor with an NMOS transistor and changing the direction of the second current source in circuit 100, the computation circuit 400 is obtained, which can be used to obtain thresholded differences of steps. There are two situations to be considered assuming that the voltage across capacitor 412 ($V_C$) is initially reset to a midrange voltage value.

In the first situation, one of two steps inputs (at $t_1$ or at $t_2$, repectively) is applied to circuit 400 before the other. If the initial step input is applied to the first input 402a of the circuit 400 (i.e., $t_1 < t_2$), then the first current source 406a provides a current $I_1 = I$ that linearly charges the capacitor 412 until the capacitor attains the positive threshold $V_{TH}$. Conversely, if the initial step input is applied to the second input 402b of the circuit 400 (i.e., $t_2 < t_1$), then the second current source 406b provides a current $I_2 = I$, and the capacitor discharges until the capacitor attains the negative threshold, $-V_{TH}$. A step output at a time $t_{OUT}$ is given as follows:

$$t_{OUT} = t_i + \frac{CV_{TH}}{I} \quad (4)$$

where i=1 when the initial step input is applied to the first input 402a, and, alternatively, i=2 when the initial step input is applied to the second input 402b.

The threshold implemented by circuit 400 is $CV_{TH}/I$. This threshold value can be simply programmed by choosing appropriate values for $V_{TH}$ and I.

In the second situation, the two step inputs arrive within the threshold time $CV_{TH}/I$. Since the positive and negative current sources exactly cancel each other, no step is generated from either the positive or negative output indicating no edge between pixels. Mismatches between the two current sources will eventually cause one of the outputs to fire, but generally at a time much longer than the frame time of the system. If the threshold time $CV_{TH}/I$ is set to be the minimum difference in intensities required between a bright pixel and dark pixel, circuit 400 can be used to determine the presence or absence of an edge between 2 adjacent pixels.

Figure 5:
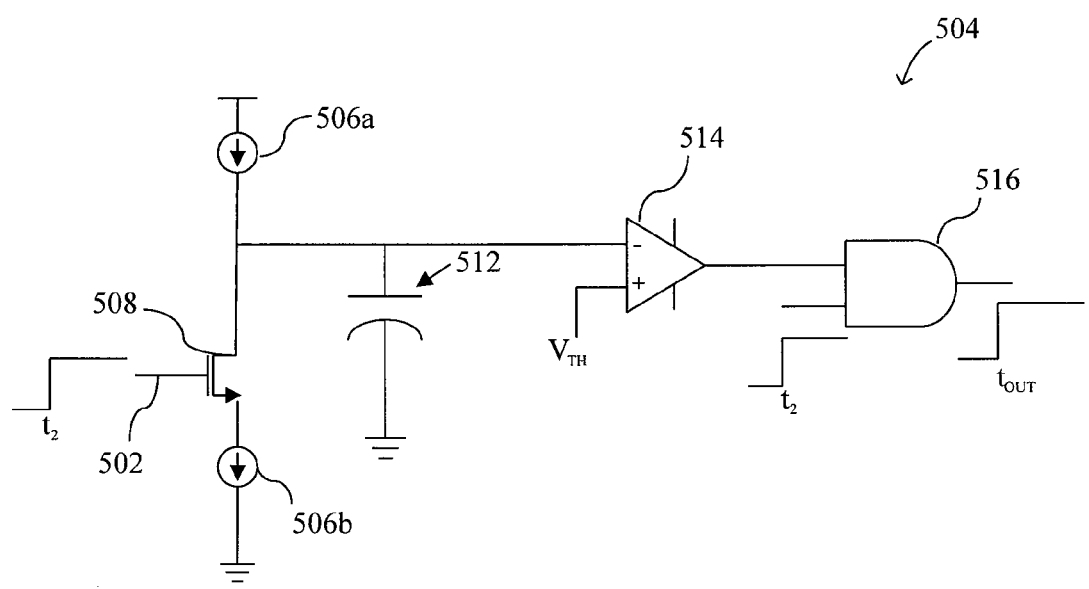
FIG. 5 is a schematic diagram of a time-mode computation circuit that computes the scalar multiplication of a temporal signal, according to another embodiment of the invention.

FIG. 5 illustrates a computation circuit 500 for computing a scalar multiplication of a temporal signal, according to still an embodiment of the invention. The computation circuit 500 illustratively includes an input 502 for receiving a temporal input signal and circuitry 504 for performing scalar multiplication based upon the temporal signal, the result being expressed in a timing of an output signal generated by the circuit.

The circuitry 504 illustratively includes first and second current sources 506a, 506b and a transistor 508. The transistor 508 is illustratively an NMOS transistor having a source, drain, and gate. The drain of the transistor 508 is connected to the first current source 506a, and the source of the transistor is connected to the second current source 506b. The gate of the transistor 508 is connected to the input 502.

The circuitry 504 further illustratively includes a capacitor 512 connected between ground and a juncture of the first current source 506a and the drain of the transistor 508. The circuitry 504 also illustratively includes a comparator 514 having a first input connected to the capacitor and the juncture of the first current source 506a and the drain of the transistor 508. A second input of the comparator 514 is connected to a voltage source that supplies a threshold voltage, $V_{TH}$. Illustratively, the circuitry 504 also includes a logic AND gate 516 having a first input connected to the output of the comparator 514 and second input for receiving the temporal signal, as shown. The output of computation circuit 500 is the output of the logic AND gate 516. The output of the computation circuit 500 is a single-ended output, and the inputs and outputs are defined with respect to a reference time.

By removing the PMOS transistor that controlled the first current source and replacing the PMOS transistor with an NMOS transistor, while also changing the direction of the second current source of the circuit 100, the computation circuit 500 performs scalar multiplication of a temporal signal entering circuit 500 at time $t_2$.

If it is assumed that the capacitor 512 is initially charged to a voltage, $V_{TH}$, the first current source 506a starts to charge the capacitor with a current $I_1$ as soon as the reference time starts. When the input step occurs at time $t_2$, the second current source 506b provides a current $I_2 (>I_1)$ that starts discharging the capacitor 512. When the capacitor voltage reaches $V_{TH}$, the comparator outputs a step at time $t_{OUT}$. The output of the comparator 514 would also contain an unwanted pulse at the reference time because the positive and negative terminals of the comparator would carry the same voltage $V_{TH}$. The logic AND gate 516 connected to the output of the comparator 514 ensures that the output from circuit 500 contains only a step output at time $t_{OUT}$.

The time-based output $t_{OUT}$ from circuit 500 is given by the following equation:

$$t_{OUT} = \left(\frac{I_2}{I_2 - I_1}\right) t_2 \qquad (5)$$

From equation (5), it is seen that circuit 500 multiplies time $t_2$ with a scalar $$\left(\frac{I_2}{I_2 - I_1}\right).$$

Figure 6:
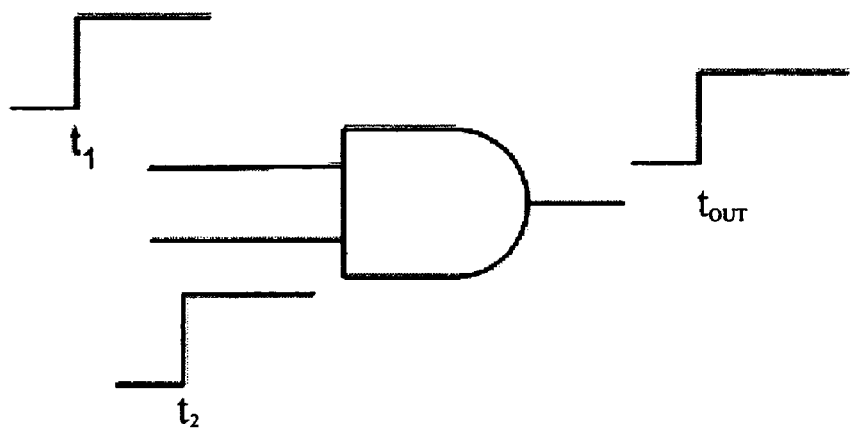
FIG. 6 is a schematic diagram of a time-mode computation circuit that computes the maximum of two temporal signals, according to yet another embodiment of the invention.

FIG. 6 illustrates a circuit 600 that computes the maximum of two temporal signals, according to an embodiment of the invention. The circuit 600 supports inputs and outputs that have absolute time as the reference. The output from circuit 600 is a single-ended output. The circuit 600 processes two temporal signals, such as time steps occurring at $t_1$ and $t_2$ as illustrated in FIG. 6, and determines the maximum, Max ($t_1$, $t_2$), of the two steps. Thus, if $t_1$ is 300 μs and $t_2$ is 600 μs, $t_{OUT}$ is 600 μs. If the signal was to be represented using voltages or currents as in conventional computation circuits, an extremely complex circuit would be required to compute Max($V_1$, $V_2$) or Max($I_1$, $I_2$). In time-based analog computation according to the invention, as demonstrated by the circuit 600 shown in FIG. 6, the circuitry to compute Max($t_1$, $t_2$) is substantially simplified.

Figure 7:
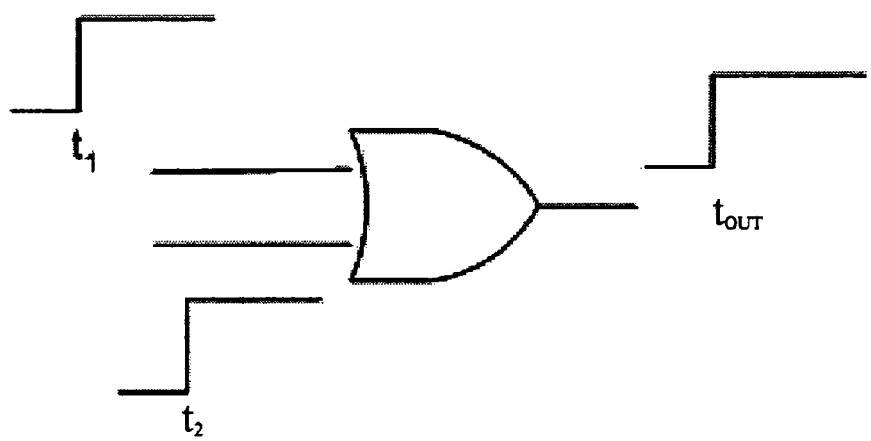
FIG. 7 is a schematic diagram of a time-mode computation circuit that computes the minimum of two temporal signals, according to still another embodiment of the invention.

FIG. 7 illustrates a circuit 700 that computes the minimum of two temporal signals, according to an embodiment of the invention. The circuit 700 supports inputs and outputs that have absolute time as the reference. The output from the circuit 700 is a single-ended output. The circuit 700 processes two time steps, such as time steps occurring at $t_1$, and $t_2$ as shown in FIG. 7, and determines the minimum, Min($t_1$, $t_2$), of the two steps. The circuit 700 achieves the same efficiencies over conventional computational architectures as noted above relative to circuit 600.

The time-based computation circuits according to the invention are expected to be applicable to a wide variety of applications. For example, present and future VLSI/Nano chips can benefit from the invention. Other applications for time-mode circuits according to the invention include Finite Impulse Response (FIR) and Infinite Impulse Response (IIR) filters, adaptive filters, multilayer perceptrons and other types of neural networks.

EXAMPLES

The present invention is further illustrated by the following specific examples, which should not be construed as limiting the scope or content of the invention in any way.

Figure 8:
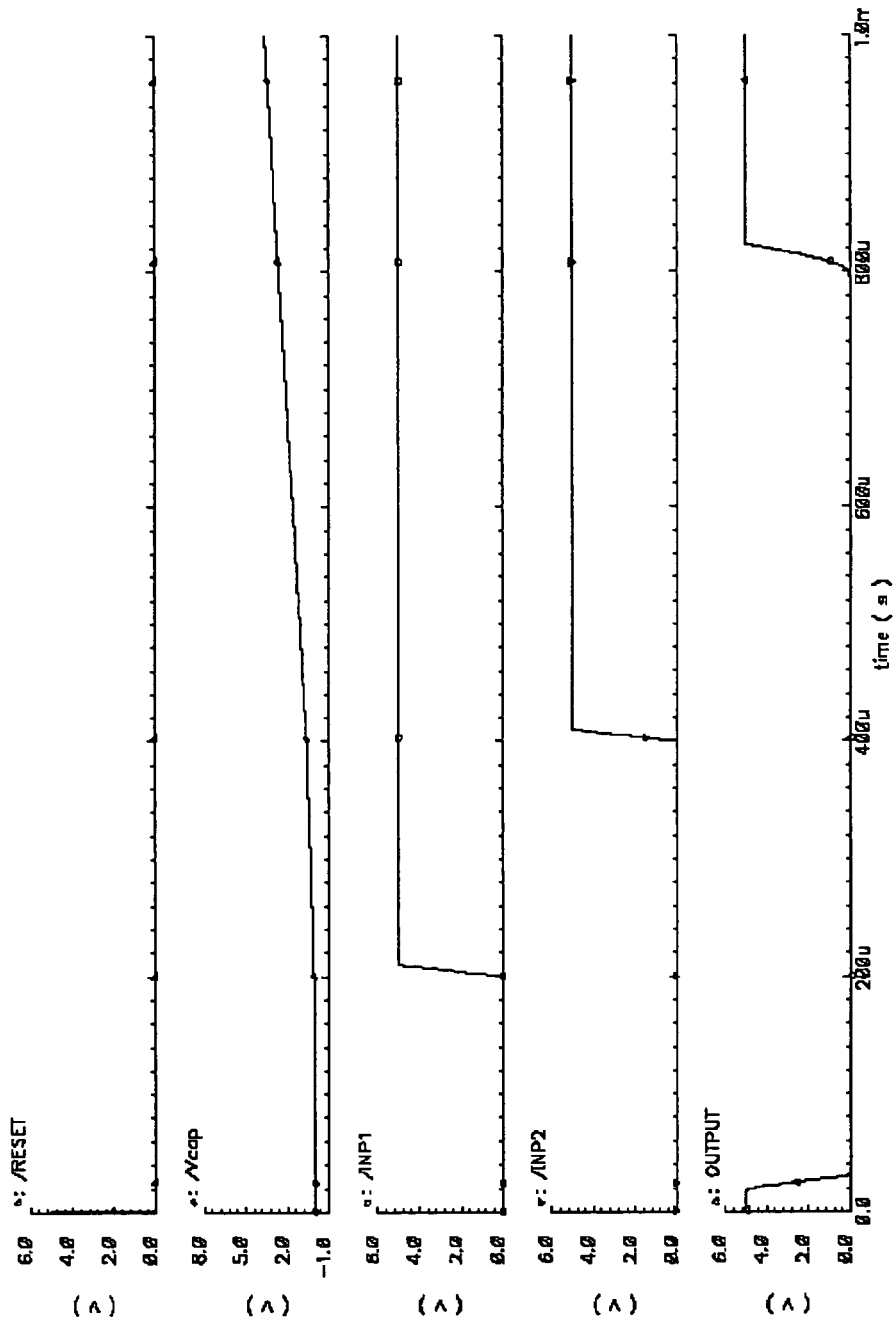
FIG. 8 shows Cadence-Spectre simulation results for arithmetic mean of two input steps using circuit 100 shown in FIG. 1 occurring at $t_1$=200 µs and $t_2$=400 µs.

Circuit 100 shown in FIG. 1 was simulated and prototype time-mode circuits according to the invention measured under a variety of conditions. FIG. 8 shows Cadence-Spectre simulation results where circuit 100 was used to compute the arithmetic mean of two input steps, $t_1$, and $t_2$. The values of $t_1$, $t_2$, C, $V_{TH}$ and I($I_1=I_2$) used in the simulation were 200 μs, 400 μs, 20 pF, 2.5V and 50 nA, respectively. The output expected from circuit 100 from equation (1) above is 800 μs which includes a 500 μs offset term ($CV_{TH}$/I) thus computing the actual mean of $t_1$ and $t_2$ of 300 μs. The output obtained from simulations performed was 801 μs. It is noted that random variations in this delay and in the current sources can lead to inaccuracies in the calculations generated.

Figure 9:
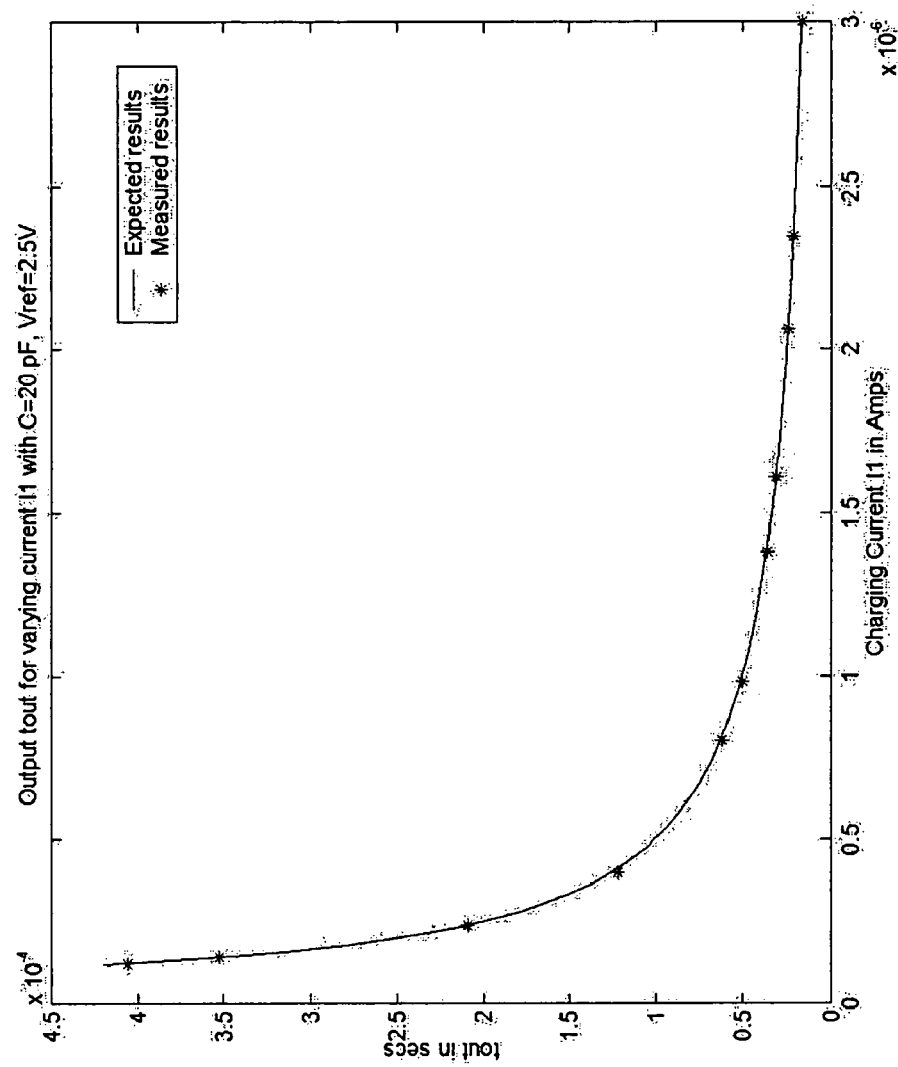
FIG. 9 shows $t_{OUT}$ measured data from circuit 100 when one step input was provided to circuit 100 and the current source $I_1$ was varied.

FIG. 9 shows measured data from a fabricated integrated circuit 100 when one step input was provided to circuit 100 (entering circuit 100 at $t_1$) with C=20 pF and Vref=2.5V. The current source I was varied and the output $t_{OUT}$ was measured and plotted. The output expected from circuit 100 when $$I = I_1 = I_2 \text{ is } t_{OUT} = t_1 + \frac{CV_{TH}}{I}.$$

Figure 10:
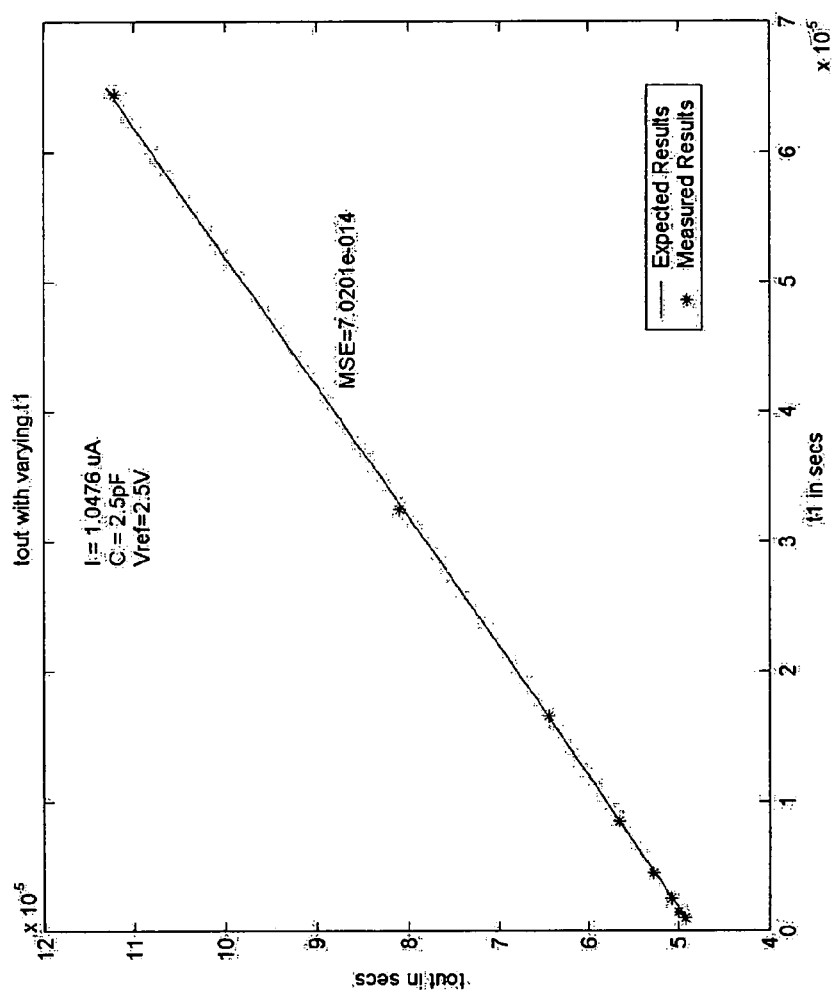
FIG. 10 shows $t_{OUT}$ measured data from circuit 100 when $t_1$ was varied externally.

FIG. 10 shows $t_{OUT}$ measured data from circuit 100 when one step input was provided to circuit 100 (entering circuit 100 at $t_1$) with C=20 pF, I=1.0476 uA and Vref=2.5V. The input transition time $t_1$ was varied externally from off-chip and the output $t_{OUT}$ was measured and plotted. The output expected from circuit 100 is $$t_{OUT} = t_1 + \frac{CV_{TH}}{I}$$

which is also plotted In FIG. 9. The mean squared error between the expected results and the measured results=$7.0201 \times 10^{-14}$ sec$^2$.

Figure 11:
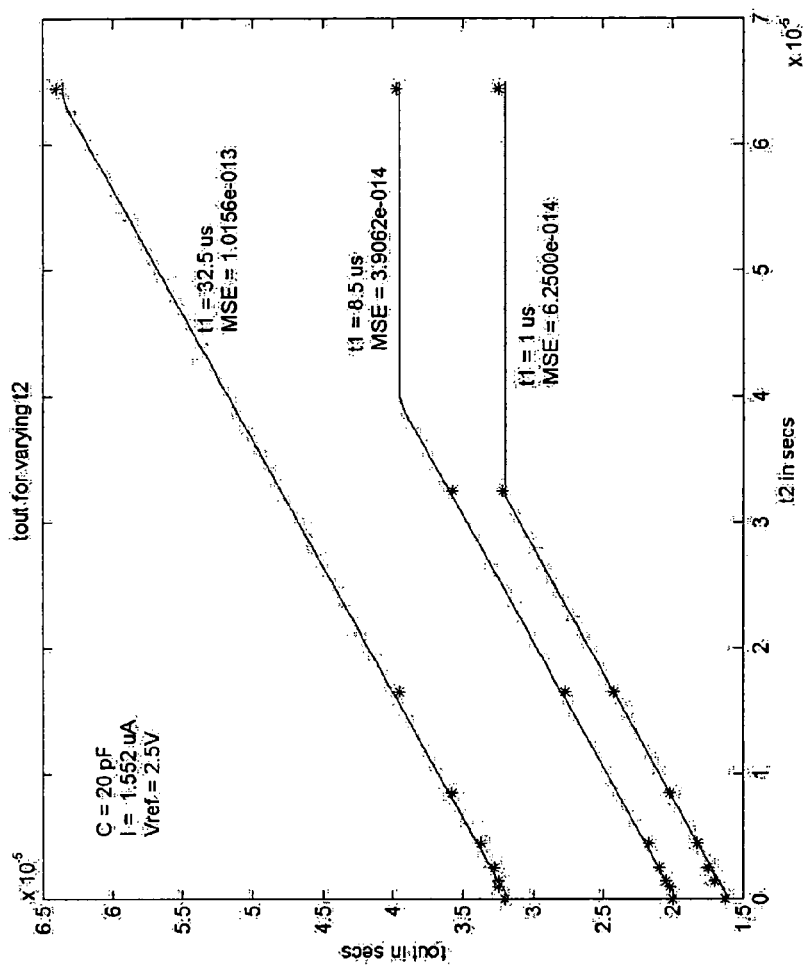
FIG. 11 shows $t_{OUT}$ measured data from circuit 100 where the first input ($t_1$) entering circuit 100 was fixed as 1 µs, 8.5 µs and 32.5 µs for three different sets of measurements. The transition time ($t_2$) of the second input was varied externally and C=20 pF, I=1.552 uA, and Vref=2.5V.

FIG. 11 shows $t_{OUT}$ measured data from circuit 100 where the first input ($t_1$) entering circuit 100 was fixed as 1 μs, 8.5 μs and 32.5 μs for three different sets of measurements. The circuit 100 components had the following values: C=20 pF, I=1.552 uA and $V_{TH}$=2.5V. The transition time ($t_2$) of the second input was varied externally and the output $t_{OUT}$ was measured and plotted. The output expected from circuit 100 for different values of $t_1$ and $t_2$ is $$t_{OUT} = \frac{t_1 + t_2}{2} + \frac{CV_{TH}}{2I}.$$

The Mean squared error between the expected results and the measured results are shown in FIG. 11.

Figure 12:
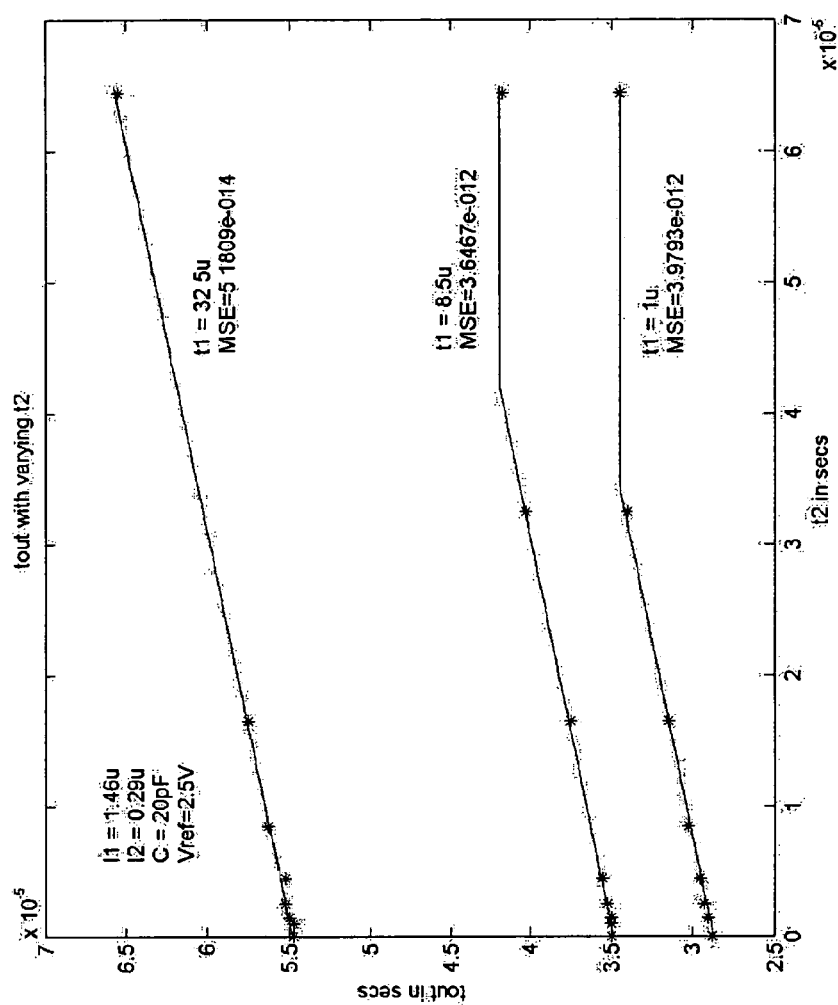
FIG. 12 $t_{OUT}$ measured data from circuit 100 where $t_2$ was varied and C=20 pF, $I_1$=1.46 uA, $I_2$=0.29 uA, Vref=2.5V with $t_1$ fixed at 1 µs, 8.5 µs and 32.5 µs.

FIG. 12 shows $t_{OUT}$ measured data from circuit 100 where the first input ($t_1$) entering circuit 100 was fixed as 1 μs, 8.5 μs and 32.5 μs for three different sets of measurements. The circuit components had the following values: C=20 pF, $I_1$=1.46 uA, $I_2$=0.29 uA and $V_{TH}$=2.5V. The transition time of the second input ($t_2$) was varied externally and the output $t_{OUT}$ was measured and plotted. The output expected from the block for different values of $t_1$ and $t_2$ is $$t_{OUT} = \frac{I_1 t_1 + I_2 t_2}{I_1 + I_2} + \frac{CV_{TH}}{I_1 + I_2}.$$

The Mean squared error between the expected results and the measured results are shown in FIG. 12.

Circuit 100 demonstrated the following measured results under the conditions C=20 pF, $I_1=I_2=0.29$ uA and $V_{TH}=2.5V$ at room temperature:

SNR: 56 dB
Common-mode DR: Close to Infinity
Differential-mode DR: 62 dB
Power Consumption: 0.6 µW This invention has been described herein in considerable detail to provide those skilled in the art with information relevant to apply the novel principles and to construct and use such specialized components as are required. However, it is to be understood that the invention can be carried out by different equipment, materials and devices, and that various modifications, both as to the equipment and operating procedures, can be accomplished without departing from the scope of the invention itself.

We claim:

1. A time-mode analog computation circuit, comprising:
at least one input for receiving a temporal input signal; and
circuitry for performing a mathematical operation based on the at least one temporal input signal, a result of the mathematical operation being expressed in a timing of an output signal generated by the circuit, wherein the circuitry comprises at least one logic gate having an input for receiving the temporal input signal.

2. The computation circuit of claim 1, wherein the mathematical operation is selected from a group consisting of a weighted averaging, addition, weighed subtraction, scalar multiplication, maximum value determination, minimum value determination, and threshold difference determination.

3. The computation circuit of claim 1, wherein the result is a time-based parameter corresponding to a time at which the circuit generates the output signal.

4. The computation circuit of claim 1, wherein the circuitry comprises:
a capacitor;
at least one current source for charging or discharging the capacitor;
at least one switch responsive to the temporal input signal for controlling the current source; and
at least one comparator for sensing a voltage across the capacitor and comparing the voltage to a threshold voltage;
the output signal being generated by the circuit when the voltage exceeds the threshold voltage.

5. The computation circuit of claim 4, wherein the at least one logic gate has another input for receiving an output of the at least one comparator.

6. The computation circuit of claim 1, wherein the temporal input signal comprises a step input.

7. The computation circuit of claim 1, wherein the output signal comprises a step output.

8. A time-mode analog computation circuit, comprising:
at least one input for receiving a temporal input signal; and
circuitry for performing a mathematical operation based on the at least one temporal input signal, the circuitry comprising
a capacitor,
at least one current source for charging or discharging the capacitor,
at least one switch responsive to the temporal input signal for controlling the current source, and
at least one comparator for sensing a voltage across the capacitor and comparing the voltage to a threshold voltage;
a result of the mathematical operation being expressed as a time-based parameter corresponding to a time at which the circuit generates an output signal, the output signal being generated by the circuit when the voltage exceeds the threshold voltage.

9. The computation circuit of claim 8, wherein the mathematical operation is selected from a group consisting of a weighted averaging, addition, weighed subtraction, scalar multiplication, maximum value determination, minimum value determination, and threshold difference determination.

10. The computation circuit of claim 8, further comprising at least one logic gate having a first input for receiving an output of the at least one comparator and a second input for receiving a temporal input signal.

11. The computation circuit of claim 8, wherein the temporal input signal comprises a step input.

12. The computation circuit of claim 8, wherein the output signal comprises a step output.

13. A signal processing method, comprising the steps of:
providing at least one temporal input signal;
performing a mathematical operation based on the at least one temporal input signal; and
expressing a result of the mathematical operation in a timing of an output signal.

14. The method of claim 13, wherein the mathematical operation is selected from a group consisting of a weighted averaging, addition, weighed subtraction, scalar multiplication, maximum value determination, minimum value determination, and threshold difference determination.

15. The method of claim 13, wherein expressing a result comprises determining a time-based parameter corresponding to a time at which the output signal is generated.

16. The method of claim 13, wherein the at least one temporal input signal comprises at least two input signals.

17. The method of claim 13, wherein the at least one temporal input signal comprises a plurality of temporal input signals, and wherein performing a mathematical operation comprises determining a difference be at least one pair of the plurality of temporal input signals.

18. The method of claim 17, wherein each of the plurality of temporal input signals is an output from a time-based imager, and wherein the difference indicates whether an edge is present in an image.

19. The method of claim 17, wherein each of the plurality of temporal input signals is an output from a distinct time-based sensor in an array of time-based sensors, and wherein the difference indicates differences between the different signals generated by distinct pairs of time-based sensors.

20. The method of claim 13, wherein the at least one temporal input signal comprises a step input.

* * * * *

UNITED STATES PATENT AND TRADEMARK OFFICE
CERTIFICATE OF CORRECTION

| | | |
|---|---|---|
| PATENT NO. | : 7,596,589 B2 | Page 1 of 1 |
| APPLICATION NO. | : 11/104141 | |
| DATED | : September 29, 2009 | |
| INVENTOR(S) | : Ravinuthula et al. | |

It is certified that error appears in the above-identified patent and that said Letters Patent is hereby corrected as shown below:

Column 1, lines 11 through 17, should read.

The United States government has certain rights to the invention by virtue of support through National Science Foundation grant no. EIA 0135946 and National Aeronautics and Space Administration grant no. NCC 2-1363.

Signed and Sealed this

Twenty-fourth Day of November, 2009

David J. Kappos
*Director of the United States Patent and Trademark Office*

UNITED STATES PATENT AND TRADEMARK OFFICE
CERTIFICATE OF CORRECTION

PATENT NO. : 7,596,589 B2
APPLICATION NO. : 11/104141
DATED : September 29, 2009
INVENTOR(S) : Ravinuthula et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1140 days.

Signed and Sealed this

Twenty-eighth Day of September, 2010

David J. Kappos
*Director of the United States Patent and Trademark Office*